(12) United States Patent
MacManus et al.

(10) Patent No.: US 11,964,584 B2
(45) Date of Patent: Apr. 23, 2024

(54) ACCESSORY POWER PACK

(71) Applicant: Apple Inc., Cupertino, CA (US)

(72) Inventors: Steven MacManus, Pleasanton, CA (US); Matthew J. Allen, Palo Alto, CA (US); Paul D. Yeomans, Morgan Hill, CA (US); Paul D. Kaufhold, San Francisco, CA (US)

(73) Assignee: APPLE INC., Cupertino, CA (US)

( * ) Notice: Subject to any disclaimer, the term of this patent is extended or adjusted under 35 U.S.C. 154(b) by 180 days.

(21) Appl. No.: 17/412,425

(22) Filed: Aug. 26, 2021

(65) Prior Publication Data

US 2022/0080851 A1   Mar. 17, 2022

Related U.S. Application Data

(60) Provisional application No. 63/079,115, filed on Sep. 16, 2020.

(51) Int. Cl.
*B60L 53/80* (2019.01)
*B60L 53/65* (2019.01)

(52) U.S. Cl.
CPC .............. *B60L 53/80* (2019.02); *B60L 53/65* (2019.02)

(58) Field of Classification Search
CPC .......... B60L 53/80; B60L 53/65; B60L 50/60; Y02T 10/70; Y02T 10/7072; Y02T 90/12; Y02T 90/14
See application file for complete search history.

(56) References Cited

U.S. PATENT DOCUMENTS

| | | | | |
|---|---|---|---|---|
| 8,761,984 B2 * | 6/2014 | Yates | ........................ | B60L 7/18 |
| | | | | 180/65.6 |
| 8,932,072 B2 * | 1/2015 | Tamaki | .................... | B62J 43/16 |
| | | | | 439/345 |
| 9,203,120 B2 * | 12/2015 | Kanazawa | ................ | H02J 7/00 |
| 9,346,365 B1 * | 5/2016 | Penilla | .................... | B60L 53/14 |
| 9,887,570 B2 * | 2/2018 | Johnsen | .................. | B60L 53/14 |
| 10,308,240 B2 * | 6/2019 | Colavincenzo | ........ | B60K 6/448 |
| 10,521,987 B1 * | 12/2019 | Jordan, III | ......... | G07C 9/00896 |

(Continued)

FOREIGN PATENT DOCUMENTS

| | | | | |
|---|---|---|---|---|
| CN | | 113733956 A | * 12/2021 | .............. B60L 53/14 |
| DE | 102022202069 A1 | * 9/2023 | | |

(Continued)

OTHER PUBLICATIONS

International Search Report and Written Opinion in PCT/US2021/048227 dated Dec. 22, 2021 (17 pp).

*Primary Examiner* — James A Shriver, II
*Assistant Examiner* — Michael T. Walsh
(74) *Attorney, Agent, or Firm* — Young Basile Hanlon & MacFarlane, P.C.

(57) ABSTRACT

A power ecosystem is disclosed that includes a premises power interface associated with a premises, a moving object power interface associated with a moving object, and an accessory power pack comprising an accessory sensor. The accessory power pack is configured to receive an electrical charge from the premises power interface, supply an electrical charge to the moving object power interface, and be releasably secured to the moving object. The accessory power pack is configured to send accessory sensor information captured by the accessory sensor to at least one of the premises or the moving object.

20 Claims, 5 Drawing Sheets

(56) References Cited

U.S. PATENT DOCUMENTS

| | | | |
|---|---|---|---|
| 10,611,247 B1 * | 4/2020 | Breen | B60D 1/62 |
| 10,894,482 B2 * | 1/2021 | Follen | B60L 58/12 |
| 11,155,153 B2 * | 10/2021 | Cafeo | H02J 7/00045 |
| 2005/0035741 A1 | 2/2005 | Elder et al. | |
| 2010/0065344 A1 * | 3/2010 | Collings, III | B60L 3/10 |
| | | | 180/2.1 |
| 2012/0299531 A1 | 11/2012 | Prosser et al. | |
| 2018/0154794 A1 * | 6/2018 | Hsiao | B60L 7/16 |
| 2019/0016231 A1 * | 1/2019 | Scaringe | H01M 10/613 |
| 2020/0136107 A1 | 4/2020 | Meyers et al. | |
| 2022/0242272 A1 * | 8/2022 | Okamoto | B60L 58/12 |

FOREIGN PATENT DOCUMENTS

| | | | | |
|---|---|---|---|---|
| EP | 2367237 A1 * | 9/2011 | | B60L 53/16 |
| JP | 2010-534289 A | 11/2010 | | |
| JP | 2013-251945 A | 12/2013 | | |
| JP | 2017-103897 A | 6/2017 | | |
| JP | 2018-518421 A | 7/2018 | | |
| JP | 2020-005463 A | 1/2020 | | |
| JP | 7120176 B2 * | 8/2022 | | |
| JP | 7183990 B2 * | 12/2022 | | |
| KR | 1595664 B1 | 2/2016 | | |
| WO | 2012/154990 A2 | 11/2012 | | |
| WO | 2013086627 A1 | 6/2013 | | |
| WO | WO-2013086627 A1 * | 6/2013 | | B60L 11/1816 |

* cited by examiner

ACCESSORY POWER PACK

CROSS-REFERENCE TO RELATED APPLICATION(S)

This application claims priority to U.S. Provisional Application Ser. No. 63/079,115, filed Sep. 16, 2020, the contents of which are incorporated herein by reference.

FIELD

The present disclosure relates generally to electrical charging and specifically to use of an accessory power pack to improve charging rates and extend operational range in a moving object.

BACKGROUND

A power-storing device in the form of a battery can be used in electric or hybrid-electric moving objects to generate driving force, either alone or in combination with an internal combustion engine. In a fully-electric moving object, the battery must be externally charged. In some examples, the external charge is supplied using equipment that converts alternating current (AC) electricity supplied from a 100 volt (V) to 120V outlet, such as an outlet found in a home or office supplied using an electricity grid, to direct current (DC) that is supplied to the battery in the moving object. The charging rate using a 100V to 120V AC source can be slow, adding from 1 to 5 miles of range per hour of charging time to range. To support longer trips (such as 50, 100, or 200 miles), an extended charge time for the battery is required.

In other examples, a home or office can be fitted with a 200V to 240V outlet to improve charging rates to 10 to 60 miles added range per hour of charging time, but this can cost thousands of dollars to install. Further, none of the 100V to 240V AC energy conversion equipment serves to extend the overall range of the moving object.

In other examples, a home or office can be fitted with a 200V to 240V outlet to improve charging rates to 10 to 60 miles added vehicle range per hour of charging time, but this can cost thousands of dollars to install. Further, none of the 100V to 240V AC energy conversion equipment serves to extend the overall range of the vehicle.

SUMMARY

One aspect of the disclosed embodiments is a power ecosystem. The power ecosystem includes a premises power interface associated with a premises, a vehicle power interface or a moving object power interface associated with a vehicle or a moving object, and an accessory power pack comprising an accessory sensor. The accessory power pack is configured to receive charge from the premises power interface, supply charge to the vehicle power interface or the moving object power interface, be releasably secured to the vehicle or the moving object, and send accessory sensor information captured by the accessory sensor to at least one of the premises, the vehicle, or the moving object.

Another aspect of the disclosed embodiments is an accessory power pack for a vehicle. The accessory power pack includes an accessory housing that is shaped to reduce a coefficient of drag or a coefficient of lift of the vehicle when releasably secured to the vehicle and an accessory power unit disposed in the accessory housing. The accessory power unit is configured to receive charge from a premises power unit of a premises and supply charge to a vehicle power unit of the vehicle. A first charging rate of the charge from the premises power unit to the accessory power unit is lower than a second charging rate of the charge from the accessory power unit to the vehicle power unit.

Another aspect of the disclosed embodiments is an accessory power pack for a vehicle. The accessory power pack includes an accessory power unit configured to receive charge from a premises power unit of a premises at a first charging rate, supply charge to a vehicle power unit of the vehicle at a second charging rate that differs from the first charging rate, and be releasably secured to the vehicle. The accessory power pack includes an accessory sensor configured to capture accessory sensor information from the accessory power unit or an environment surrounding the accessory power pack and an accessory controller configured to send accessory sensor information captured by the accessory sensor to the vehicle or the premises.

DETAILED DESCRIPTION

An accessory power pack for use as part of a power ecosystem is disclosed. The accessory power pack can be charged at a low or slow rate (e.g. a first charging rate), such as from a 100V to 120V AC outlet available at a home or office. Once charged, the accessory power pack can be coupled to a vehicle or a moving object to supply charge to the vehicle or the moving at a higher or fast rate (e.g. a second charging rate), such as through a DC to DC connection. The accessory power pack can be used to extend operating range for the vehicle or the moving object, allowing a user to avoid stopping the vehicle or the moving object to charge the power unit of the vehicle or the moving object on longer trips. The accessory power pack can be designed in a variety of sizes, shapes, and interface types to support aerodynamic improvements in operation of the vehicle or the moving object. The accessory power pack can be designed to support specific user activities such as hauling cargo or powering tools. The accessory power pack can include accessory sensor(s) that provide accessory sensor information to the vehicle (or the moving object, the home, or the office) to supplement security systems, safety systems, or other operations.

Figure 1:
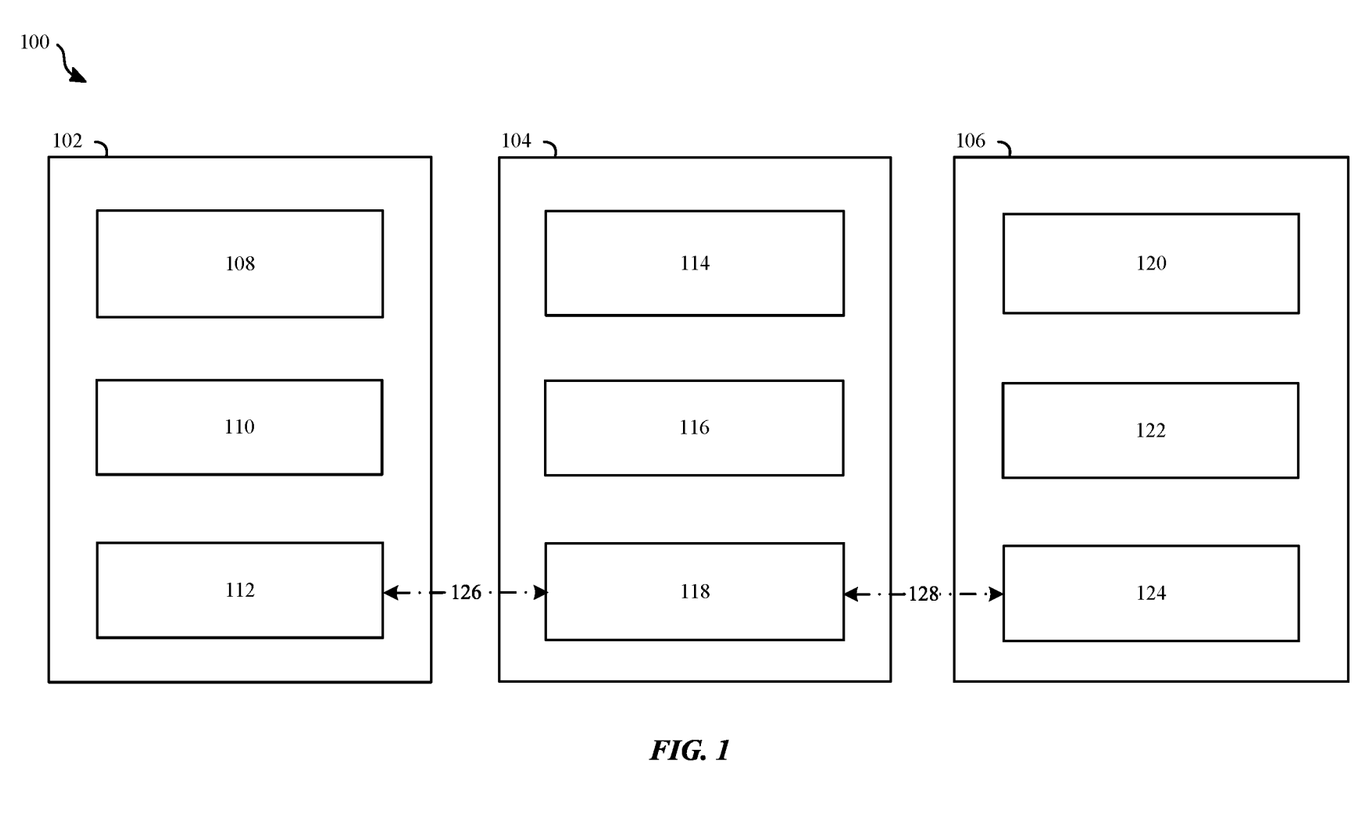
FIG. 1 is a block diagram of a power ecosystem including a premises power interface, an accessory power pack, and a vehicle or other moving object.

FIG. 1 is a block diagram of a power ecosystem 100 suitable for use with the accessory power pack and charging methods described herein. The power ecosystem 100 is implemented by select portions or elements of a premises 102, an accessory power pack 104, and a vehicle 106.

The premises 102 of FIG. 1 includes one or more premises sensor(s) 108, a premises controller 110, and a premises power unit 112. These components can be attached to or form part of a physical structure on the premises 102, such as coupled to or forming part of an exterior or interior wall of a home, an office, or a garage (not shown), or can be present on or part of grounds, land, or other property. The term "premises" is used to represent a physical structure configured with a power supply, such as a wall with a power outlet, a dock configured to receive and charge the accessory power pack 104, or a vehicle charging station accessible to the vehicle 106.

For example, the premises 102 can be a home with garage-based or other outdoor power access or a vehicle charging station in a parking lot of an office building. The premises sensor(s) 108, premises controller 110, and premises power unit 112 are electrically interconnected to allow transmission of signals, data, commands, etc., between them, either over wired connections, (e.g., using a wired communications bus) or over wireless data communications channels. Conventional components of other types may be included in the premises 102, such as parking spaces, storage compartments, user interfaces, windows, doors, etc. (not shown).

The accessory power pack 104 includes one or more accessory sensor(s) 114, an accessory controller 116, and an accessory power unit 118. These components can be attached to or form part of a physical structure of the accessory power pack 104, such as within a housing or body of the accessory power pack 104 that is designed with aerodynamic features (not shown) and configured to be releasably secured to the vehicle 106. The components in the accessory power pack 104 are electrically interconnected to allow transmission of signals, data, commands, etc., between them, either over wired connections, (e.g., using a wired communications bus) or over wireless data communications channels. Components of other types may be included in the accessory power pack 104, such as mounting mechanism(s), locking mechanism(s), user interface(s), storage compartment(s), etc. (not shown). For example, the accessory power pack 104 can be configured to be physically secured to the vehicle 106 to achieve a connected position or a coupled position and removed or released from the vehicle 106 to achieve a disconnected position or a decoupled position. Connection or coupling can be effected by the user via the mounting mechanism and controlled by the locking mechanism (not shown).

The vehicle 106 includes one or more vehicle sensor(s) 120, a vehicle controller 122, and a vehicle power unit 124. These components can be attached to or form part of a physical structure of the vehicle 106, such as part of a body, interior, suspension, or frame (not shown), and are electrically interconnected to allow transmission of signals, data, commands, etc., between them, either over wired connections, (e.g., using a wired communications bus) or over wireless data communications channels. Components of other types may be included in the vehicle 106, such as a suspension system, a seating system, a ventilation system, an infotainment system, etc. (not shown). The vehicle 106 can be referred to as a moving object and include devices such as an automobile, a robot, an unmanned aerial vehicle, or any other device configured to interface with the accessory power pack 104.

In the power ecosystem 100, the premises power unit 112 is configured to supply charge to the accessory power unit 118 via a premises power interface 126 that can include any manner of wired or wireless interface that allows the premises power unit 112 to supply charge, such as a charging cable, charge connectors, or a wireless inductive charging system. For example, the premises power unit 112 can supply charge through a 100V to 120V AC outlet or a 220V to 240V AC outlet (e.g., at a first charging rate). Charging rates can vary with an AC source of this type, such as between 5 miles of range per charging hour to 50 miles of range per charging hour depending on the type of vehicle 106. Though shown as extending between the premises 102 and the accessory power pack 104, the premises power interface 126 may also be configured to supply charge to or receive charge from the vehicle 106 (not shown). The premises power interface 126 can also be configured to support data communications with other components or systems, such as by sending data transmissions to or receiving data transmissions from the accessory power pack 104 or the vehicle 106.

The accessory power unit 118 is configured to store charge for later use by the vehicle 106. For example, the accessory power unit 118 can be sized to store between 20 kilowatt hours (kWh) and 40 kWh of power received from the premises power unit 112. The accessory power unit 118 can supply the stored charge to the vehicle power unit 124 via an accessory power interface 128 that can include any manner of wired or wireless interface that allows the accessory power unit 118 to supply charge, such as a charging cable, charge connectors, or a wireless inductive charging power source. The accessory power unit 118 can be configured to convert AC power into DC power (e.g., using an inverter) in order to supply charge to the vehicle 106 at a higher charging rate than is possible using the premises power unit 112 (e.g., at a second charging rate), such as between 150 miles per charging hour to 300 miles of range per charging hour depending on the type of vehicle 106. Though shown as extending between the accessory power pack 104 and the vehicle 106, the accessory power interface 128 may also be configured to supply charge to or receive charge from the premises 102 (not shown). The accessory power interface 128 can also be configured to support data communications with other components or systems, such as by sending data transmissions to or receiving data transmissions from the premises 102 or the vehicle 106.

The premises sensor(s) 108 can capture or receive information about the premises 102 or about an environment surrounding the premises 102 which is referred to as premises sensor information. Premises sensor information may also include information about the accessory power pack 104 or the vehicle 106 if located proximate to or otherwise coupled with the premises 102. The premises sensor(s) 108 can be configured to capture charging information, imaging information, LIDAR information, radar information, ultrasonic information, proximity information, identification information, or location information. For example, premises sensor information may include information that the accessory power pack 104 is electrically coupled to the premises 102 and is currently receiving electrical charge from the premises power unit 112.

The accessory sensor(s) 114 can capture or receive information about the accessory power pack 104 or about an environment surrounding the accessory power pack 104 which is referred to as accessory sensor information. Accessory sensor information may also include information about the premises 102 or the vehicle 106 if located proximate to or otherwise coupled with the accessory power pack 104. The accessory sensor(s) 114 can be configured to capture locking information, charging information, imaging information, LIDAR information, radar information, ultrasonic information, proximity information, identification information, or location information. For example, accessory sensor information may include information that the accessory power pack 104 is physically or electrically coupled to the vehicle 106 in a connected position or a coupled position, is currently supplying electrical charge to the vehicle power unit 124 via the accessory power interface 128, or has a locking mechanism (not shown) that has been tampered with or disabled.

The vehicle sensor(s) 120 can capture or receive information about the vehicle 106 or about an environment surrounding the vehicle 106 which is referred to as vehicle sensor information. Vehicle sensor information may also include information about the premises 102 or the accessory power pack 104 if located proximate to or otherwise coupled with the vehicle 106. Vehicle sensor information captured by the vehicle sensor(s) 120 can relate to presence or engagement of the accessory power pack 104 to the vehicle 106, presence and location of other vehicles, pedestrians, and/or objects in the environment, operating conditions of the vehicle 106, and other conditions within the vehicle 106 or exterior to the vehicle 106. For example, vehicle sensor information may include a vehicle location and traffic information for vehicular or pedestrian traffic around the vehicle 106.

The premises controller 110 can use premises sensor information to determine status for the premises power unit 112, determine charging requirements for the accessory power unit 118 when coupled to the premises 102 via the premises power interface 126, and to support operation of various premises systems (not shown) that may be associated with charging functions, such as security systems, lighting systems, ventilation systems, etc.

The accessory controller 116 can use accessory sensor information to determine status for the accessory power unit 118 or determine charge levels, charging speed, or connection status when receiving charge from the premises power unit 112 or sending charge to the vehicle power unit 124. The accessory controller 116 can also be configured to send accessory sensor information to the premises 102 or the vehicle 106.

The vehicle controller 122 can use vehicle sensor information to understand the environment around the vehicle 106 and to support operation of various vehicle systems such as propulsion systems, autonomous control systems, or driver safety systems. The vehicle controller 122 can be configured to supplement vehicle sensor information with accessory sensor information when the accessory power pack 104 is releasably secured to the vehicle 106. For example, the accessory sensor information can include charge level information for the accessory power unit 118, identification information or authorization information that validates use of the accessory power pack 104 with the vehicle 106, or imaging information for an environment surrounding the accessory power pack 104 that improves operation of the driver safety systems of the vehicle 106.

Figure 2:
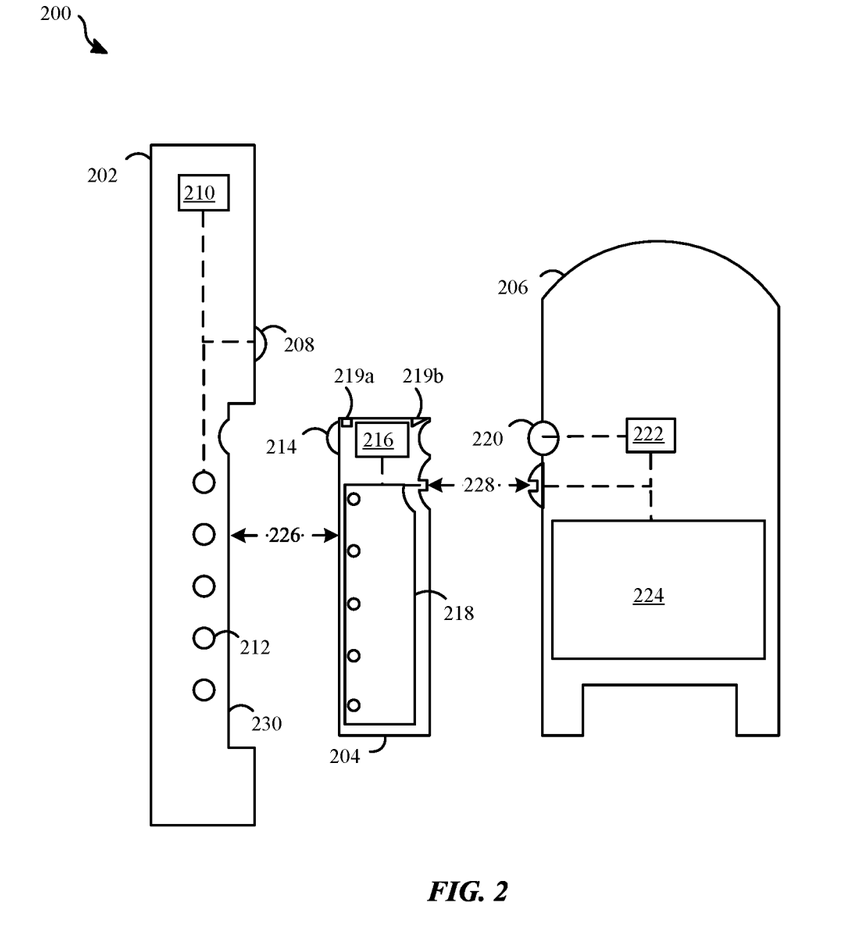
FIG. 2 is an illustration of a power ecosystem showing interfaces between a premises, an accessory power pack, and a vehicle or other moving object.

FIG. 2 is an illustration of a power ecosystem 200 showing interfaces between a premises 202, an accessory power pack 204, and a vehicle 206. The premises 202, the accessory power pack 204, and the vehicle 206 can have similar features to the premises 102, the accessory power pack 104, and the vehicle 106 described in respect to FIG. 1.

The premises 202 of FIG. 2 includes a premises sensor 208, a premises controller 210, and a premises power unit 212. These components can be similar to the premises sensor(s) 108, the premises controller 110, and the premises power unit 112 of the premises 102 in FIG. 1, so only differences or additional features and implementation examples will be described in reference to FIG. 2.

The premises power unit 212 is shown as including a series of coils configured for wireless inductive charging (e.g. at a first charging rate). To support charging the accessory power pack 204, the premises 202 includes a wall-type structure defining a recess 230 shaped and sized to secure, receive, or otherwise mount the accessory power pack 204. The premises sensor 208 can be configured to detect presence and position of the accessory power pack 204 for security purposes or to support charge positioning. For example, the premises sensor 208 may detect that the accessory power pack 204 is spaced apart from the recess 230 at a partially connected position (based on distance between components) that allows charging of the accessory power pack 204, but at a degraded charging rate. The premises controller 210 can receive premises sensor information from the premises sensor 208 indicative of the partially connected position of the accessory power pack 204 and, based on the premises sensor information, send a command to illuminate an indicator (not shown) associated with the premises 202 or the accessory power pack 204 or send a message to a user interface (not shown) to alert the user to reposition the accessory power pack 204 to a connected position (i.e. a position that improves the charging rate to the first charging rate).

The accessory power pack 204 of FIG. 2 includes an accessory sensor 214, an accessory controller 216, and an accessory power unit 218. These components can be similar to the accessory sensor 114, the accessory controller 116, and the accessory power unit 118 of the accessory power pack 104 in FIG. 1, so only differences or additional features and implementation examples will be described in reference to FIG. 2.

The accessory power pack 204 can be releasably secured to the premises 202, for example, using a locking mechanism, a mounting mechanism, magnetic attraction, or another mechanism (e.g., a locking mechanism 219a) to secure a connection or hold a position of the accessory power pack 204 in relation to the premises 202 to support both security features and proper orientation of the accessory power pack 204 for an improved charging rate between the premises power unit 212 and the accessory power unit 218. The accessory sensor 214 is shown as fitting into the recess 230 of the premises 202, for example, to better guide positioning or to avoid damage to the accessory sensor 214 when the accessory power pack 204 is releasably secured to the premises 202.

The accessory power unit 218 is shown as including a series of coils configured for wireless inductive charging, for example, when located in a connected position that is proximate to the coils of the premises power unit 212. The accessory power unit 218 also includes storage capabilities such that charge received from the premises power unit 212 is stored as energy within the accessory power pack 204 for later use, such as when the accessory power pack 204 is coupled to the vehicle 206 so that the accessory power pack 204 can provide range extension capabilities to the vehicle 206. In some examples, the accessory power pack 204 can store between 15 kWh and 50 kWh depending on energy storage capabilities (and size) of the accessory power unit 218.

A premises power interface 226 is shown as a bi-directional dotted line arrow between the coils of the premises power unit 212 and the coils of the accessory power unit 218. Though the premises power interface 226 is shown with wireless charging capabilities, the accessory power pack 204 may alternatively include a cable (e.g. a retractable cord) and a connector (e.g. a plug) that couples with a 100V to 120V or 220V to 240V AC outlet located along a wall of or in the recess 230 of the premises 202 (not shown). Other power transfer interfaces between the premises 202 and the accessory power pack 204 are also possible, and the voltage levels are only examples, as other outlet voltage levels are possible.

The vehicle 206 of FIG. 2 includes a vehicle sensor 220, a vehicle controller 222, and a vehicle power unit 224. These components can be similar to the vehicle sensor 120, the vehicle controller 122, and the vehicle power unit 124 of the vehicle 106 in FIG. 1, so only differences or additional features and implementation examples will be described in reference to FIG. 2.

The accessory power pack 204 can be releasably secured to the vehicle 206, for example, using a locking mechanism, a mounting mechanism, magnetic attraction, or another mechanism (e.g., a locking mechanism 219b) to hold a position of the accessory power pack 204 in relation to the vehicle 206 as in a physically connected position and/or electrically coupled position to support both security features and proper orientation for improved charging rate between the accessory power unit 218 and the vehicle power unit 224. The vehicle sensor 220 is shown as configured to fit into a recess of the accessory power pack 204, for example, to better guide positioning of the accessory power pack 204 onto the vehicle 206 during connection or to avoid damage to the vehicle sensor 220 by the accessory power pack 204.

In the example of FIG. 2, the vehicle controller 222 can be configured to receive accessory sensor information from the accessory sensor 214 via the accessory controller 216 when the accessory power pack 204 and the vehicle 206 are coupled. In this way, if functionality of the vehicle sensor 220 is limited by presence of the accessory power pack 204, the vehicle controller 222 can rely on accessory sensor information from the accessory sensor 214 to maintain operation of various vehicle systems. In other examples, the accessory sensor 214 can provide additional or supplemental sensor information to the vehicle controller 222 to improve functionality of various vehicle systems. For example, the accessory sensor 214 can have imaging capabilities to extend a field of view of a back-up camera system for the vehicle 206. In another example, the accessory sensor 214 can be configured with communication capabilities to enable wireless or satellite network access so that the accessory power pack 204 can support wireless user devices within or otherwise proximate to the vehicle 206. In another example, the accessory sensor 214 can identify a location of the accessory power pack 204 to the vehicle controller 222 if the accessory power pack 204 is removed or misplaced.

An accessory power interface 228 is shown as a bi-directional dotted line arrow between a male connector electrically coupled to the accessory power unit 218 and a female connector electrically coupled to the vehicle power unit 224. The male-to-female connection of the accessory power interface 228 can be a DC to DC connection configured to support a charging rate (e.g. a second charging rate) that is higher than the (AC to AC first) charging rate of the premises power interface 226. Though the accessory power interface 228 is shown as a DC to DC male-to-female connection, other connection types, such as AC and DC combinations are also possible. Since the accessory power pack 204 is a portable unit with low or no installation costs intended to leverage available power from the premises 202, the connection types associated with the accessory power interface 228 can vary based on needs of the user without causing undue cost.

In one example of the power ecosystem 200, the accessory power pack 204 can be positioned in the recess 230 of the premises 202, such as by parking the vehicle 206 with the accessory power pack 204 connected to the vehicle 206 in an appropriate location within a garage of a home. The premises power interface 226 can then supply charge (e.g. at the first charging rate) over several hours such as overnight, when electricity costs for the premises 202 are low as compared to peak power costs. Once fully charged, the accessory power unit 218 can be used to extend operational range for the vehicle 206 by supplying charge (e.g. at the second charging rate) to the vehicle power unit 224, for example, when the vehicle power unit 224 becomes depleted to a predetermined level during operation of the vehicle 206. In this way, the vehicle 206 can avoid stopping to recharge the vehicle power unit 224 on a longer trip, saving time and cost for a user of the vehicle 206. In addition to providing improved energy storage capacity to increase overall range for the vehicle 206, the accessory power pack 204 can be shaped to improve vehicle aerodynamics as described herein.

Figure 3:
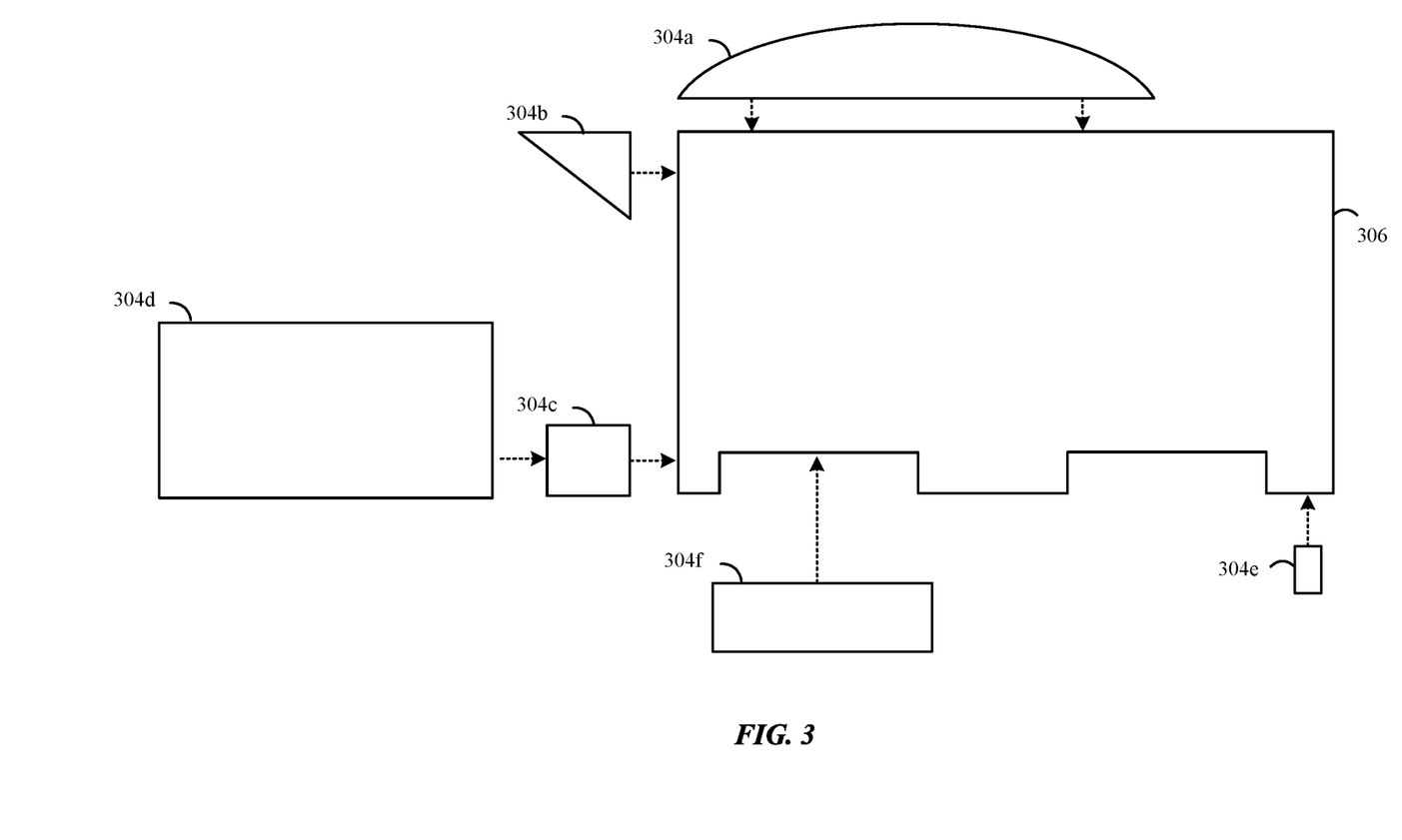
FIG. 3 is an illustration showing examples of form factors for accessory power packs and interfaces between accessory power packs and a vehicle or other moving object.

FIG. 3 is an illustration showing examples of form factors or housing types for accessory power packs 304a-f as well as interfaces between the accessory power packs 304a-f and a vehicle 306 indicated with dotted-line arrows to show general installation locations. The accessory power packs 304a-f are shown in a variety of sizes, shapes, and types to support aerodynamic improvement in operation of the vehicle 306 to further extend operating range of the vehicle 306, support application specific-activities, or both. The examples shown are not exhaustive, but include a storage container or roof rack (304a), a rear spoiler (304b), a rear bumper or hitch assembly (304c), a storage container or trailer (304d), a wheel cover (304f), and a front fascia, belly pan, or air dam (304e) for use with the vehicle 306.

The shape and installation locations of the accessory power packs 304b, 304f, and 304e are configured to reduce a coefficient of drag or a coefficient of lift of the vehicle 306 when releasably secured to the vehicle 306. For example, the rear spoiler 304b can encourage a smooth transition from laminar to turbulent flow at a rear of the vehicle 306 during driving, reducing rear lift and drag, thus extending operating range for the vehicle 306 given a fixed charge capacity. In another example, the wheel cover 304f can reduce turbulence within a wheel well or flow interruptions across a tire and wheel (not shown) of the vehicle 306 to reduce drag, extending operating range for the vehicle 306. In another example, the front fascia, belly pan, or air dam 304e can reduce turbulence or flow interruptions caused by underbody components of the vehicle to reduce drag or balance lift, extending operating range for the vehicle 306.

The accessory power packs 304a, 304c, and 304d are configured to add storage or other capabilities to the vehicle 306. For example, the storage container or roof rack 304a can include both an accessory power unit (not shown) similar to the accessory power units 118, 218 of FIGS. 1 and 2 and physical space or a cavity to store belongings of the user of the vehicle 306. The storage container or roof rack 304a is also shaped to encourage laminar flow and reduce drag to improve (or avoid detriment to) operating range for the vehicle 306. In another example, the rear bumper or hitch assembly 304c can include an accessory power unit (not shown) similar to the accessory power units 118, 218 of FIGS. 1 and 2 and support a bicycle rack (not shown), include components (not shown) to attach a trailer, or work in combination with another component such as the rear spoiler 304b or the trailer 304d to provide additional physical storage and/or additional energy storage when receiving charge, for example, from a premises power unit (not shown) similar to the premises power units 112, 212 of FIGS. 1 and 2. The rear bumper or hitch assembly 304c can be designed to be positioned within a wake of the vehicle 306, making its aerodynamic impact negligible.

In another example, the storage container or trailer 304d can include both an accessory power unit (not shown) similar to the accessory power units 118, 218 of FIGS. 1 and 2 and physical space or a cavity to store belongings of the user of the vehicle 306. Alternatively, the trailer 304d can be designed both to supply charge to the vehicle 306 and to supply power to separate components. For example, the trailer 304d can be designed to store tools for a contractor such as drills, saws, or other power tools, and the contractor can use power from the trailer 304d to power both the vehicle 306 and her power tools while working on a job site. In another example, the trailer 304d can be designed to store a projection screen and a speaker system, and a traveling entertainer can use power from the trailer 304d to power both the vehicle 306 and his audio-visual equipment for an outdoor performance.

Figure 4:
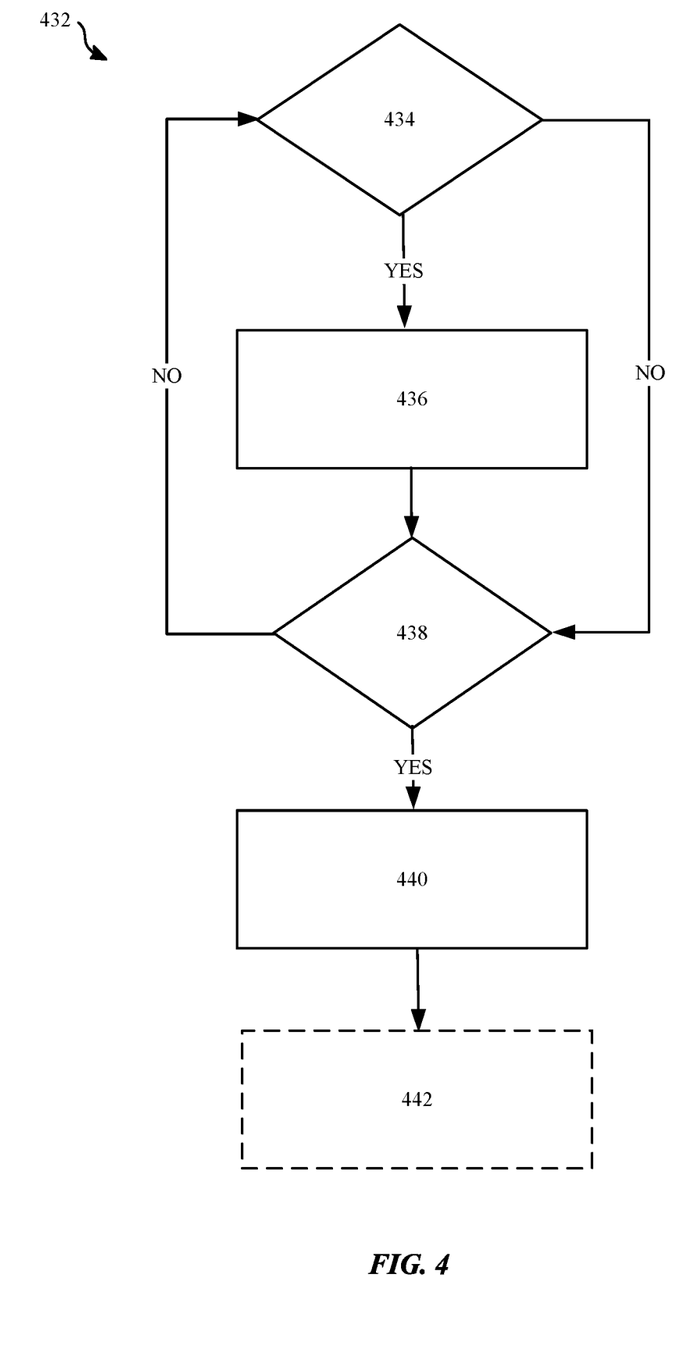
FIG. 4 is a flow diagram showing a charging process using the accessory power pack.

FIG. 4 is an illustration that shows a charging process 432 using an accessory power pack. The process 432 can be implemented using the power ecosystems 100, 200 of FIG. 1 or FIG. 2. The process 432 will be described by referring back to the power ecosystem 200 of FIG. 2 that includes the premises 202, the accessory power pack 204, and the vehicle 206. The form factor of the accessory power pack 204 of FIG. 2 is generic, though various form factors such as those shown and described in respect to the accessory power packs 304a-f of FIG. 3 can be used to support the process 432 of FIG. 4.

In decision block 434, the premises 202 or the accessory power pack 204 can receive premises sensor information or accessory sensor information (e.g., from the premises sensor 208 or the accessory sensor 214) sufficient to determine whether a charge connection is established between the premises 202 and the accessory power pack 204. The charge connection can include a physical connection, such as a cable being coupled between the premises 202 and the accessory power pack 204, or a proximity threshold being met for a distance or relational position between the premises 202 and the accessory power pack 204. For example, the vehicle 206 with the accessory power pack 204 attached can pull into a garage where the recess 230 associated with the premises 202 is located such that the accessory power pack 204 is positioned within the recess 230 at a location sufficient to allow wireless inductive charging (e.g. a connected position).

If the decision block 434 determines that a charge connection is established between the premises 202 and the accessory power pack 204, the process 432 continues to operation 436. In operation 436, the accessory power pack 204 receives an electrical charge from the premises 202, for example, via the premises power interface 226. The electrical charge from the premises power interface 226 to the accessory power pack 204, specifically, the accessory power unit 218, can be received at a charging rate associated with the connection type. If the premises power interface 226 includes a 100V to 120V or 220V to 240V AC outlet, the charging rate can be relatively low or slow, such as between 5 miles of range per charging hour to 50 miles of range per charging hour. This slow charging rate, also called a trickle charge, can require between 4 hours and 12 hours to fully charge the accessory power pack 204, depending on storage capacity or size of the accessory power unit 218. The cost to supply this charge is relatively low, and off-peak times can be leveraged, such as nighttime hours.

If the decision block 434 determines that no charge connection is established between the premises 202 and the accessory power pack 204, the process 432 continues to decision block 438. In decision block 438, the accessory power pack 204 or the vehicle 206 can receive accessory sensor information or vehicle sensor information sufficient to determine whether a charge connection is established between the accessory power pack 204 and the vehicle 206. The charge connection can include an electrical connection, such as a male-to-female connector coupling between the accessory power pack 204 and the vehicle 206. The charge connection can also be established based on a status of a mechanical or electro-mechanical locking mechanism (e.g., the locking mechanism 219b).

The locking mechanism 219b can be part of the accessory power pack 204 or the vehicle 206 and can be configured to control engagement of the accessory power pack 204 to the vehicle 206 (or the premise 202) and release of the accessory power pack 204 from the vehicle 206 (or the premises 202) based on accessory sensor information from the accessory sensor 214 or vehicle sensor information from the vehicle sensor 220. The locking mechanism 219b can be both a security measure and a safety measure to avoid unintended removal of the accessory power pack 204 from the vehicle 206 (or the premises 202). For example, the locking mechanism 219b can be configured to prohibit release of the accessory power pack 204 from the vehicle 206 or the premises 202 based on accessory sensor information from the accessory sensor 214 indicating attempted interference from an unauthorized party or an incorrect entry of a security code from a user.

If the decision block 438 determines that no charge connection is established between the accessory power pack 204 and the vehicle 206, the process 432 returns to decision block 434 and starts over. In other words, the accessory controller 216 can be configured to determine whether any charge connections are established, with either the premises 202 or the vehicle 206, before any further steps of the process 432 occur.

If the decision block 438 determines that a charge connection is established between the accessory power pack 204 and the vehicle 206, the process 432 continues to operation 440. In operation 440, the vehicle power unit 224 receives an electrical charge from the accessory power unit 218, for example, via the accessory power interface 228. The electrical charge from the accessory power interface 228 to the vehicle power unit 224 can be received at a charging rate associated with the connection type. If the accessory power interface 228 includes a DC to DC connection, the charging rate can be relatively high or fast, such as between 150 miles of range per charging hour to 300 miles of range per charging hour. This fast charging rate can require less than 30 minutes or less than 1 hour to transfer power from the accessory power pack 204 to the vehicle power unit 224, depending on capacity, providing readily available range extension during operation of the vehicle 206 and allowing a user to avoid unnecessary stops to recharge the vehicle power unit 224 on longer trips.

The process 432 can continue to optional operation 442 (shown as optional in dotted line). In optional operation 442, the accessory power pack 204 can send accessory sensor information captured by the accessory sensor 214 to at least one of the premises 202 or the vehicle 206. Accessory sensor information that can be sent to the premises 202 can include information identifying a charge level of the accessory power pack 204, information identifying a position of the accessory power pack 204 in relation to the recess 230 in the premises 202 to support efficient wireless charging, or imaging information to support security systems of the premises 202. Accessory sensor information that can be sent to the vehicle 206 can include information that the accessory power pack 204 is supplying charge to the vehicle power unit 224, that a locking mechanism (not shown) that secures the accessory power pack 204 to the vehicle has been tampered with or disabled (a security feature), or that another vehicle or pedestrian is proximate to the accessory power pack 204 to support vehicle safety systems.

Figure 5:
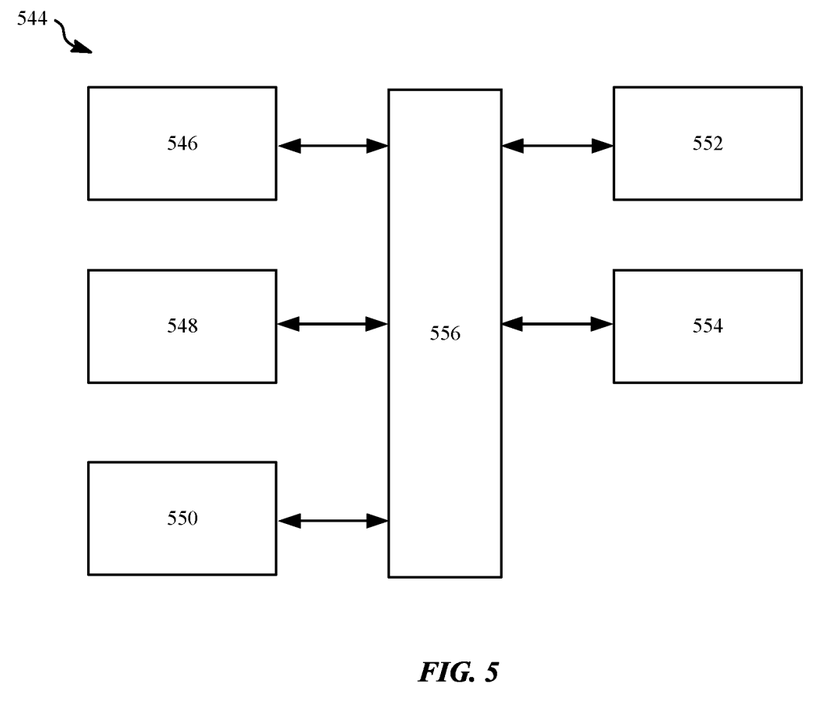
FIG. 5 is an illustration of a computing device.

FIG. 5 shows an example of a computing device 544 that may be used to implement the power ecosystems 100, 200 of FIGS. 1 and 2 and the accessory power packs 304a-f of FIG. 3. In the illustrated example, the computing device 544 includes a processor 546, a memory device 548, a storage device 550, one or more input devices 552, and one or more output devices 554. These components may be interconnected by hardware such as a bus 556 that allows communication between the components.

The processor 546 may be a conventional device such as a central processing unit and is operable to execute computer program instructions and perform operations described by the computer program instructions. The memory device 548 may be a volatile, high-speed, short-term information storage device such as a random-access memory module. The storage device 550 may be a non-volatile information storage device such as a hard drive or a solid-state drive. The input devices 552 may include sensors and/or any type of human-machine interface, such as buttons, switches, a keyboard, a mouse, a touchscreen input device, a gestural input device, or an audio input device. The output devices 554 may include any type of device operable to send commands associated with communication or charging operations or provide an indication to a user regarding an authorization or status, such as a display screen, an interface for charging operations, or an audio output.

As used in the claims, phrases in the form of "at least one of A, B, or C" should be interpreted to encompass only A, or only B, or only C, or any combination of A, B, and C.

As described above, one aspect of the present technology is the gathering and use of data available from various sources, such as from the premises sensor(s) 108, 208, the accessory sensor(s) 114, 214, or the vehicle sensor(s) 120, 220 to improve the function of a power ecosystem such as the power ecosystems 100, 200 of FIG. 1 and FIG. 2. The present disclosure contemplates that in some instances, this gathered data may include personal information data that uniquely identifies or can be used to contact or locate a specific person. Such personal information data can include demographic data, location-based data, telephone numbers, email addresses, twitter IDs, home addresses, data or records relating to a user's health or level of fitness (e.g., vital signs measurements, medication information, and exercise information), date of birth, or any other identifying or personal information.

The present disclosure recognizes that the use of personal information data, in the present technology, can be used to the benefit of users. For example, the personal information data can be used in a power ecosystem to identify authorized users. Other uses for personal information data that benefit the user are also possible. For instance, health and fitness data may be used to provide insights into a user's general wellness or may be used as positive feedback to individuals using technology to pursue wellness goals.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users and should be updated as the collection and/or use of data changes. Personal information from users should be collected for legitimate and reasonable uses of the entity and not shared or sold outside of those legitimate uses. Further, such collection/sharing should occur after receiving the informed consent of the users.

Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the US, collection of or access to certain health data may be governed by federal and/or state laws, such as the Health Insurance Portability and Accountability Act (HIPAA); whereas health data in other countries may be subject to other regulations and policies and should be handled accordingly. Hence different privacy practices should be maintained for different personal data types in each country.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, in the case of power ecosystems, the present technology can be configured to allow users to select to "opt in" or "opt out" of participation in the collection of personal information data during registration for services or anytime thereafter. In addition to providing "opt in" and "opt out" options, the present disclosure contemplates providing notifications relating to the access or use of personal information. For instance, a user may be notified upon downloading an app that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing specific identifiers (e.g., date of birth, etc.), controlling the amount or specificity of data stored (e.g., collecting location data a city level rather than at an address level), controlling how data is stored (e.g., aggregating data across users), and/or other methods.

Therefore, although the present disclosure broadly covers use of personal information data to implement one or more various disclosed embodiments, the present disclosure also contemplates that the various embodiments can be implemented without the need for accessing such personal information data. That is, the various embodiments of the present technology are not rendered inoperable due to the lack of all or a portion of such personal information data. For example, changes in operation of a power ecosystem can be implemented for a given user by inferring user preferences or user status based on non-personal information data, a bare minimum amount of personal information, other non-personal information available to the system, or publicly available information.

What is claimed is:

1. A power ecosystem, comprising:
a premises power interface associated with a premises and comprising a premises sensor configured to capture premises sensor signals;
a vehicle power interface associated with a vehicle and comprising a vehicle sensor configured to capture vehicle sensor signals; and
an accessory power pack comprising an accessory sensor configured to capture accessory sensor signals, the accessory power pack configured to:
receive charge from the premises power interface;
supply charge to the vehicle power interface;
be releasably secured to the premises;
be releasably secured to the vehicle;
send accessory sensor signals captured by the accessory sensor to the premises when releasably secured to the premises; and
send accessory sensor signals captured by the accessory sensor to the vehicle when releasably secured to the vehicle,
wherein the premises is configured to supplement the premises sensor signals with the accessory sensor signals when the accessory power pack is secured to the premises, and
wherein the vehicle is configured to supplement the vehicle sensor signals with the accessory sensor signals when the accessory power pack is secured to the vehicle.

2. The power ecosystem of claim 1, wherein the charge from the premises power interface to the accessory power pack is received at a first charging rate and the charge from the accessory power pack to the vehicle power interface is supplied at a second charging rate that differs from the first charging rate.

3. The power ecosystem of claim 2, wherein the first charging rate is lower than the second charging rate.

4. The power ecosystem of claim 1, wherein the accessory sensor is configured to capture at least one of charging, imaging, LIDAR, radar, ultrasonic, proximity, identification, or location signals.

5. The power ecosystem of claim 1, wherein when the accessory power pack is releasably secured to the premises, the accessory sensor signals supplement operation of a security system or a safety system of the premises.

6. The power ecosystem of claim 5, wherein the accessory power pack comprises a locking mechanism configured to secure a connection between the accessory power pack and at least one of the vehicle or the premises.

7. The power ecosystem of claim 6, wherein the locking mechanism is configured to prohibit release of the accessory power pack from the at least one of the vehicle or the premises based on the accessory sensor signals from the accessory sensor.

8. The power ecosystem of claim 1, wherein the accessory power pack is configured to reduce a coefficient of drag or a coefficient of lift of the vehicle when releasably secured to the vehicle.

9. The power ecosystem of claim 8, wherein the accessory power pack is configured as a spoiler, an air dam, a wheel cover, a fascia, or a belly pan for the vehicle.

10. The power ecosystem of claim 1, wherein the accessory power pack is configured to add storage capabilities to the vehicle as a trailer, a roof rack, a spoiler, a storage container, or a hitch assembly for the vehicle.

11. An accessory power pack for a vehicle, comprising:
an accessory housing that is shaped to reduce a coefficient of drag or a coefficient of lift of the vehicle when releasably secured to the vehicle; and
an accessory power unit disposed in the accessory housing and configured to:
receive charge from a premises power unit of a premises;
supply charge to a vehicle power unit of the vehicle; and
send authorization signals to the vehicle to validate use of the accessory power pack with the vehicle,
wherein a first charging rate of the charge from the premises power unit to the accessory power unit is lower than a second charging rate of the charge from the accessory power unit to the vehicle power unit.

12. The accessory power pack of claim 11, further comprising:
a locking mechanism configured to control whether the accessory power pack is releasable from the vehicle.

13. The accessory power pack of claim 11, further comprising:
accessory sensors configured to capture accessory sensor signals from an environment surrounding the accessory power pack; and
an accessory controller configured to receive the accessory sensor signals from the accessory sensors and send the accessory sensor signals to at least one of the vehicle and the premises.

14. The accessory power pack of claim 11, wherein the accessory housing is shaped as a spoiler, an air dam, a wheel cover, a fascia, or a belly pan for the vehicle.

15. The accessory power pack of claim 11, wherein the accessory housing is configured to be releasably secured to the premises.

16. An accessory power pack for a vehicle, comprising:
an accessory power unit configured to:
receive charge from a premises power unit of a premises at a first charging rate;
supply charge to a vehicle power unit of the vehicle at a second charging rate that differs from the first charging rate; and
be releasably secured to the vehicle;
an accessory sensor configured to capture accessory sensor signals including imaging signals for an environment surrounding the accessory power pack; and
an accessory controller configured to send the accessory sensor signals captured by the accessory sensor to the vehicle or the premises.

17. The accessory power pack of claim 16, wherein the accessory sensor is further configured to capture at least one of charging, LIDAR, radar, ultrasonic, proximity, identification, or location signals.

18. The accessory power pack of claim 16, wherein the accessory power pack is configured to reduce a coefficient of drag or a coefficient of lift of the vehicle when releasably secured to the vehicle.

19. The accessory power pack of claim 18, wherein the accessory power pack is configured as a spoiler, an air dam, a wheel cover, a fascia, or a belly pan for the vehicle.

20. The accessory power pack of claim 16, wherein the accessory power pack is configured to add storage capabilities to the vehicle as a trailer, a roof rack, a spoiler, a storage container, or a hitch assembly for the vehicle.

\* \* \* \* \*